May 3, 1932.  W. I. JONES  1,856,813
SNAP FASTENER STUD MEMBER
Filed Oct. 4, 1929
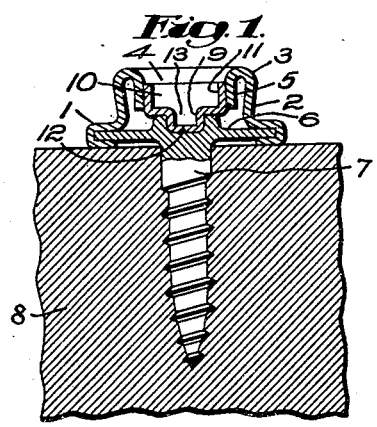
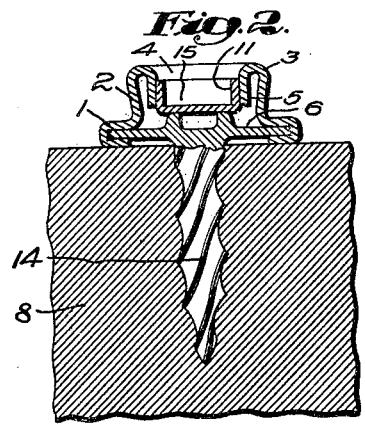
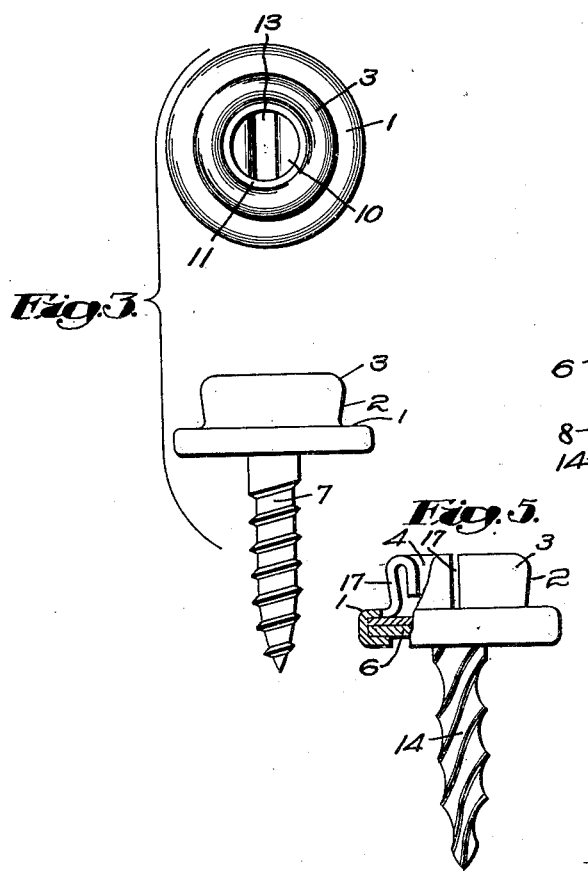
Inventor:
Walter I. Jones,
by Emery, Booth, Varney & Townsend
Attys Patented May 3, 1932

1,856,813

UNITED STATES PATENT OFFICE

WALTER I. JONES, OF ARLINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SNAP FASTENER STUD MEMBER

Application filed October 4, 1929. Serial No. 397,399.

My invention aims to provide improvements in separable fastener studs.

In the drawings, which illustrate preferred embodiments of my invention:—

Figure 1 is a section showing one form of stud attached to a stud support by a wood screw;

Fig. 2 is a section showing a slightly different form of device adapted particularly for studs attached by a drive screw;

Fig. 3 includes a plan and side elevation, respectively, of the stud shown in Fig. 1;

Fig. 4 is a section of a third form of stud; and

Fig. 5 is a part section and part elevation of a stud like that shown in Fig. 4, but with the cap split to provide a yieldable head.

My invention is particularly adapted for stud members of separable fasteners which are attached to rigid supporting structures by means of screws. The screws are made of steel because that metal is strong and durable and the caps and sealing pieces are made of brass because that metal is particularly adapted to be "drawn" into the shape desired. Furthermore, brass or other similarly useful metal will not rust.

Each of the studs which I have illustrated in the drawings are assembled from three separate pieces, and vary only in form to suit the particular use of the stud.

Referring now to Figs. 1 and 3 of the drawings, I have illustrated a stud which has a sheet metal cap provided with a base 1, a neck 2 and a head 3. The head and neck are shaped to cooperate with a suitable socket, not shown. An aperture 4, surrounded by a wall 5, is provided in the central portion of the head for purposes hereinafter described.

An attaching element in the form of a wood screw has a head 6 secured to the base 1 of the stud in the usual manner and the threaded shank 7 extends from the head 6 into the support 8. The head 6 is provided with a tool-receiving depression which is illustrated (Fig. 1) in the form of a screw-driver slot 9. This slot 9 would be exposed through the opening 4 in the head of the cap for reception of a screw-driver, except for the fact that I prefer to close the aperture 4 and conceal the head 6 of the attaching element by means of the sealing part 10. In Figs. 1 and 3 the sealing part 10 is shown as being cup-shaped with the wall 11 tightly engaging the wall 5 surrounding the aperture 4 to hold it in place. This sealing part conceals the head 6 of the attaching element so that if the head becomes rusted it will not be exposed to view when the stud is attached. Furthermore, the sealing part 10 is provided to exclude water and moisture from the head 6.

The bottom of the cup-shaped sealing part 10 is provided with a depending portion 12 which fits into the slot 9 and also provides a groove 13 into which a screw-driver may be inserted to turn the screw into or out of engagement with the support 8.

The stud illustrated in Fig. 2 is similar to that shown in Figs. 1 and 3, except that the screw shank 14 is in the nature of a drive screw. The sealing part 15 is without a depending portion to fit into the slot in the screw head because it is unnecessary when attaching the stud. However, when it is desirable to remove the fastener from the support 8 the operator merely drives a screw-driver blade through the bottom of the sealing element into the underlying slot in the head of the screw. Then by turning the screw-driver in a contra-clockwise direction the drive screw may be turned out of the support.

In Fig. 4, I have shown a stud construction wherein the sealing part is in the nature of a thin disc 16 which is shaped to fit the contour of the head of the attaching element. This disc 16 is clamped between the base 1 of the cap and the head 6 of the attaching element and thereby covers the head 6 and keeps water and moisture from coming in contact therewith.

In Fig. 5, I have shown the same type and construction of stud as shown in Fig. 4, except that I have divided the head 3, neck 2 and wall 5 surrounding the aperture 4 by slits 17 to permit contraction and expansion of the stud head for yieldable engagement with a rigid socket.

While I have illustrated and described certain specific embodiments of my invention, I do not wish to be limited thereby, as the scope of my invention is best defined in the following claim.

What I claim is:

A snap fastener member comprising, in combination, an apertured cap having means for engagement with a cooperating fastener member, said cap also having a base, an attaching element having a head secured within the base of said cap and a threaded shank portion projecting from the head of said attaching element for securing the snap fastener element to a support, means providing a depression in the head of said attaching element, a third part independent of the cap and the attaching element and secured between the cap and the head of the attaching element and concealing the head of the attaching element, and said third part having a portion adjacent to the depression in the head of the attaching element which permits insertion of a tool into said depression for rotation of said attaching element when it is desirable to remove the fastener member from a supporting structure.

In testimony whereof, I have signed my name to this specification.

WALTER I. JONES.